Nov. 26, 1968  R. H. LUND  3,412,594
RIVET INSTALLATION TOOL
Filed Oct. 27, 1966  2 Sheets-Sheet 1
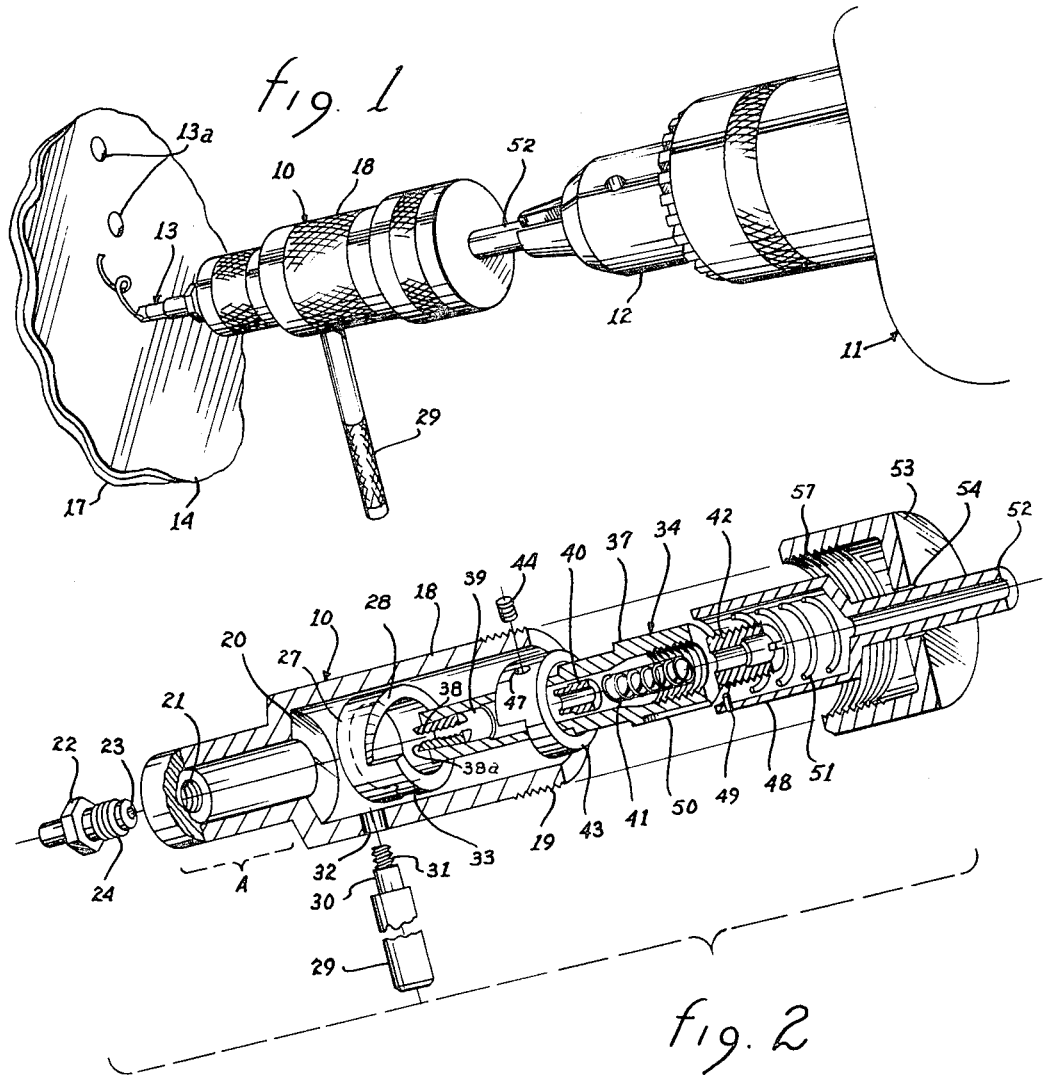
INVENTOR.
RICHARD H. LUND
BY
Drummond & Cahill
ATTORNEYS

United States Patent Office 3,412,594
Patented Nov. 26, 1968

3,412,594
RIVET INSTALLATION TOOL
Richard H. Lund, 4213 E. Montecito,
Phoenix, Ariz. 85018
Filed Oct. 27, 1966, Ser. No. 589,924
1 Claim. (Cl. 72—391)

This invention relates to power driven hand tools.

More particularly, this invention concerns a power driven rivet installation tool.

In a further aspect, the invention concerns a rivet installation tool particularly adapted for upsetting pull-type blind rivets.

In a still further aspect, the invention concerns a rivet installation tool of the type above described for rotational insertion and upsetting of self-drilling pull-type blind rivets.

During the fabrication of products from sheet metal, various types of fasteners are employed for the purpose of securing two or more layers of sheet metal in a firmly joined face-to-face attachment. One of the commonly employed fastening devices is the rivet. In the use of conventional rivets, it is required that the layers of material to be affixed are first aligned and then clamped, or otherwise held in position. A hole of suitable diameter for the rivet to be used is then bored through the layer of material. After the rivet is inserted into the hole, it is necessary that the rivet be "bucked-up" on one side while a rivet upsetter is employed on the other side. This practice is exceedingly cumbersome in that both sides of the sheet metal fabrication have to be accessible, and often results in misfitted parts, as the vibration necessary to upset the rivet frequently disturbs the alignment.

To alleviate the problems encountered by the necessary accessibility to both sides of the fabrication, there has been in recent years a development of a series of so-called "blind" rivets. One of the more common types of blind rivets is the pull-type blind rivet, in which the rivet comprises a sleeve with a head on one end and a shank provided with a protuberance extending through the sleeve from the blind side. After the parts to be adjoined have been aligned, clamped and drilled, the pull-type blind rivet is inserted into the hole from the available side of the fabrication; then, by means of a special tool which bears against the head of the rivet and attempts to withdraw the shank through the rivet, the protuberance upsets the blind side of the rivet.

Pull-type blind rivets still require that each layer of the fabrication be drilled and that the drilled holes be held in alignment while the rivet is inserted.

To alleviate the difficulties encountered in maintaining alignment of the holes within the layers to be adjoined, I have invented a self-drilling, pull-type blind rivet as described in my co-pending application Ser. No. 535,425, filed Mar. 18, 1966. The use of my self-drilling, pull-type blind rivet still requires two separate operations, each utilizing a different piece of equipment. First, it is necessary that the rivet be secured in the chuck of an electric drill motor, or other suitable rotating means, by which the rivet is rotated, thereby concurrently drilling its own hole and being inserted therein. A blind rivet installation tool, either of the power or hand type, is then employed for engaging the shank to upset the blind end of the rivet.

It would be highly advantageous, therefore, to provide a device which would eliminate the necessity of separate pieces of equipment and expedite the installation of self-drilling, pull-type blind rivets.

Accordingly, it is a principal object of the present invention to provide a device for the installation of pull-type blind rivets.

A further object of the invention is to provide a device for the installation of self-drilling, pull-type blind rivets.

Still another object of the invention is the provision of a power driven, compact rivet installation tool which will conveniently and securely install self-drilling, pull-type blind rivets.

Yet another object of the invention is the provision of a rivet installation tool of the above type which is readily adaptable for use with various diameters and lengths of rivets.

These and other objects and advantages of the present invention will become apparent to those skilled in the art from the following detailed description of the invention taken in conjunction with the drawings, in which:

FIG. 1 is a perspective view of the device chosen for purposes of illustrating the presently preferred embodiment of the invention, as the device would appear in operation;

FIG. 2 is an exploded perspective view, partly in section, of the device of FIG. 1;

FIG. 3 is an elevational view, partly in section, of a self-drilling, pull-type blind rivet, such as is described in my co-pending application Ser. No. 535,425 filed Mar. 18, 1966, for use with the device of the present invention;

Figure 5:
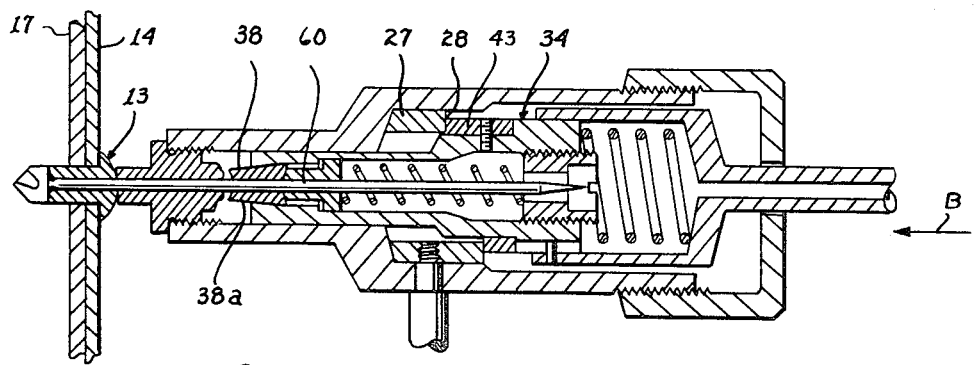
Figure 6:
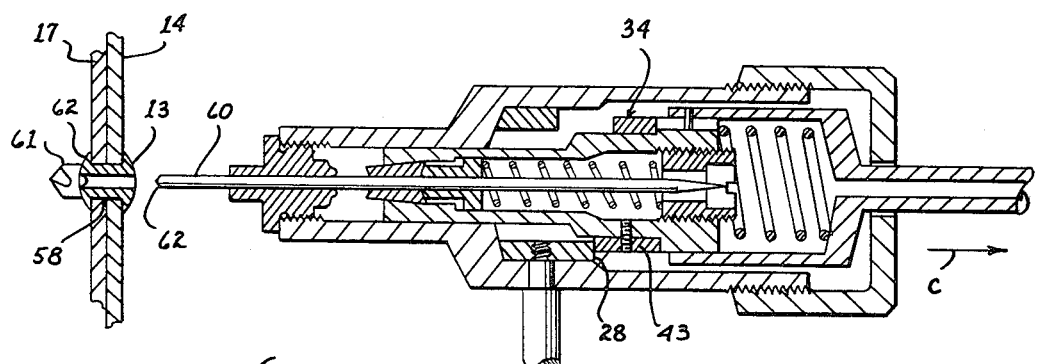

FIG. 5 is an elevational view, in section, illustrating the operative arrangement of the elements therein just after the rivet has been inserted and prior to upsetting the blind end of the shank; and FIG. 6 is an elevational view, in section, illustrating the operative arrangement of the elements therein after the rivet has been completely installed; the blind end has been upset, the shank separated and withdrawn from the rivet.

Briefly, in accordance with my invention, I provide a rivet installation tool for installing self-drilling, pull-type blind rivets, particularly adapted to be power driven by an electric drill motor, or other suitable rotating means, and having an outwardly extending handle to stabilize the installation tool, and replaceable guides to accommodate various sizes of rivets.

The main housing of the rivet installation tool is an elongate tubular member stepped down to a substantially smaller diameter proximate the lower end. Threadedly engaged within the extreme lower end is an insert having a central aperture which functions as a rivet guide. A series of these inserts are provided, each having a different diameter of aperture to accommodate the shanks of various sized rivets.

The coaxial variant diameters of the housing create an internal shoulder. Abutting the shoulder is an annular member having a cam-rise portion disposed on its upper surface. In the presently contemplated embodiment, a handle used for stabilizing the housing against rotation, extends through the side of the housing and threadedly engages the side of the annular cam member for mutual locational retainment.

A chuck assembly is disposed within the housing and adapted for coaxially rotational and longitudinal movement therein. The chuck assembly comprises a tubular casing of multi-coaxial external diameters. The lower end of the casing extends into the smaller internal diameter of the housing and forms a rotatable bearing fit therein. An annular cam-follower is secured to the casing at a portion above the aforementioned cam-rise surface.

A pair of collet-type gripping jaws are carried by the nethermost internal portion of the casing. The outer surface of the pair of gripping jaws form a downwardly converging truncated, conical section. The lower end of the casing in which the jaws are housed is correspondingly shaped, such that when the jaws are forced downwardly, a gripping action ensues and, alternately, as the jaws are retracted upwardly, their gripping force is relaxed. A sleeve abuts the rear of the gripping jaws and is held in retention against the jaws by a compression spring which is retained by an insert threadedly engaged in the uppermost end of the casing.

A thin-walled tubular bell housing coaxially encompasses a portion of the upper outside diameter of the casing and is adapted on its outer surface to form a rotatable bearing within the main housing. A pin, press-fitted into the wall of the bell housing, engages a slot located longitudinally on the outer diametrical surface of the casing. The pin and slot arrangement allows the bell housing to rotatably drive the casing and, concurrently, permit a limited longitudinal movement between the two components. A compression spring is disposed within the bell housing; one end of the spring bears against the upper face of the casing, while the other end of the spring bears against the upper internal surface of the bell housing.

A coaxial shaft extends upwardly from the bell housing. A housing cap, having a central aperture to permit passage of the bell housing shaft, is threadedly secured to the main housing to contain the operative components therein.

In operation, the bell housing shaft is secured within the chuck of an electric drill motor, or other suitable rotating means, to form a substantially integrated single operative tool comprising the rivet installation tool and the power drive source.

The shank of a self-drilling, pull-type blind rivet is inserted through the aperture of the rivet guide and upwardly between the pair of gripping jaws. The pressure exerted by the shank of the rivet retracts the jaws upwardly to permit passage of the rivet shank. The rivet is inserted until the head of the rivet abuts the lower end of the rivet guide. The upper end of the rivet shank extends through the collar and the compression spring, which now urges the gripping jaws downwardly to firmly engage the shank of the rivet.

The stabilizing handle of the rivet installation tool is now grasped with one hand, while the drill motor is held with the other. The combined tool, with rivet in place, is positioned against the surface of the layers to be fastened together, whereupon the drill motor is triggered and the rotational drilling phase begins. Driving moment is transmitted from the drill motor chuck to the bell housing shank and bell housing. As the bell housing rotates, the pin located in the wall thereof rotates the chuck assembly casing. The gripping jaws are now in a wedged frictional engagement with the casing, with the shank of the rivet secured within, as previously described. Thus, the rivet is rotated causing the drilling head of the rivet to bore a hole through the layers to be adjoined.

During the drilling operation, the upwardly resultant force created by the drilling resistance urges the chuck assembly rearwardly within the housing to maintain the cam-rise surface and cam-follower in a spaced relationship. After the rivet has penetrated the material to be adjoined, and the head of the rivet abuts the outer surface thereof, the upwardly exerted force upon the chuck assembly is diminished. The housing of the rivet installation tool is now prohibited from further downward movement by the abutment of the face of the rivet guide against the head of the rivet. Continued downwardly applied rotational force by the drill motor causes the chuck assembly to slide downwardly within the housing. Concurrently, the gripping jaws slide downwardly on the shank of the rivet and reassume their grasp at a shortened location upon the shank. In this relocated operative relationship of the components of the rivet installation tool, the cam-follower of the chuck assembly engages the cam-rise surface secured within the housing. The continued rotational force applied by the drill motor rotates the cam-follower over the face of the cam-rise surface causing the chuck assembly to retract rearwardly with a "snap" action. During this operation, the spring located between the casing and the bell housing acts as a buffer between the chuck assembly and the drive motor, allowing the casing to retract rearwardly into the bell housing.

The relatively sudden rearward movement of the chuck assembly tends to withdraw the drilling head of the rivet shank through the sleeve of the rivet body. The rivet is thereby upset and the pieces to be adjoined are firmly secured. After the rivet has been upset, and the drilling head can no longer move, the shank is still urged rearwardly by the retraction of the chuck assembly. The tensional force applied to the rivet at this time is sufficient to overcome a weakened section of the shank, located within the sleeve of the rivet, caused by an annular indentation of the shank, whereupon the shank separates, leaving a smooth-headed, firmly placed rivet.

Turning now to the drawings, in which the same reference numerals indicate corresponding elements throughout the various views, FIG. 1 illustrates a presently preferred embodiment of the invention chosen for purposes of illustration and shows the rivet installation tool generally designated by the reference numeral 10 and the attached drill motor 11 having a chuck 12. In this view, a rivet has just begun the drilling cycle in the operation of riveting two layers of materal 14 and 17. Rivets 13a are illustrative of those already having been installed by the device of the present invention.

Turning now to FIG. 2, the elements of the rivet installation tool 10 are shown in detail in an exploded fragmentary manner. The main housing 18 is an elongate tubular member having an external screw flight 19 disposed along a portion of its uppermost end. Along the area designated as A, the housing 18 which is of a somewhat reduced diameter, creates an internal shoulder 20. An internal thread 21 extends through the nethermost end of the housing 18. An insert 22 having a central aperture 23 contains an external thread 24 for threaded insertion into the internal thread 21. An annular member 27 having an upwardly projecting cam-rise surface 28 is so disposed within the housing 18 that its lower edge abuts the shoulder 20. A handle 29 having a coaxial depending reduced diameter extension 30 supporting a threaded end 31 is inserted through the wall of the housing 18 such that the extension 30 locates within the opening 32 in said housing 19 and the threaded end 31 engages a mating threaded aperture 33 in said annular member 27.

A chuck assembly, generally designated by the reference numeral 34, has a tubular casing 37 adapted for coaxial rotation and longitudinal movement within the main housing 18. A pair of collet-type gripping jaws 38 and 38a, having internal serrated gripping teeth and a downwardly extending truncated conical outer surface, are carried by a mating truncated conical bored section 39 disposed internally of the lower end of the casing 37. A sleeve 40 is positioned behind the gripping jaws 38 and 38a and is held in abutment thereto by a compression spring 41. An insert 42 is threadedly engaged within the uppermost end of the casing 37 to retain the compression spring 41. An annular cam-follower 43 is secured coaxially to the casing 37 by a screw 44 which passes through a hole 47 in the side of the cam follower 43. (Not herein shown, but as will be readily apparent to those skilled in the art, the casing 37 is provided with a suitable threaded receptacle for the screw 44.)

A bell housing 48 coaxially and locationally encompasses the upper end of the casing 37. The outer surface of the bell housing 48 forms a rotatable bearing within the housing 18 by which the rear portion of the chuck assembly 37 is supported. A pin 49 press-fitted, or otherwise secured to the wall of the bell housing 48, extends radially inward to engage a slot 50 extending longitudinally along that portion of the casing 37 enclosed by the bell housing 48, thereby providing a means by which the bell housing 48 may rotate the chuck assembly 34 and allow a limited degree of longitudinal movement therebetween. A compression spring 51 is disposed coaxially within the bell housing 48 to exert downward tension upon the rearward surface of said chuck assembly 34. A shaft 52 depends coaxially upward from the bell housing 48, said shaft 52 being the primary drive means for said rotatable chuck assembly 34 when inserted into the chuck 12 of a drill motor 11, as illustrated in FIG. 1. A housing cap 53, having a central aperture 54 in which the shaft 52 is journaled, carries an internal threaded portion 57 which engages the external screw flight 19 of the main housing 18.

FIG. 3 depicts a self-drilling, pull-type blind rivet 13 of the type particularly adapted for use with the rivet installation tool 10 as previously described in connection with FIGS. 1–2. The rivet 13 generally comprises a sleeve 58 and an attached head 59. A shank 60 having a drilling head 61 disposed on the blind side of the rivet extends through the sleeve 58. An annular indentation 62 forms a weakened portion of the shank 60 for predetermined separation thereof.

Figure 4:
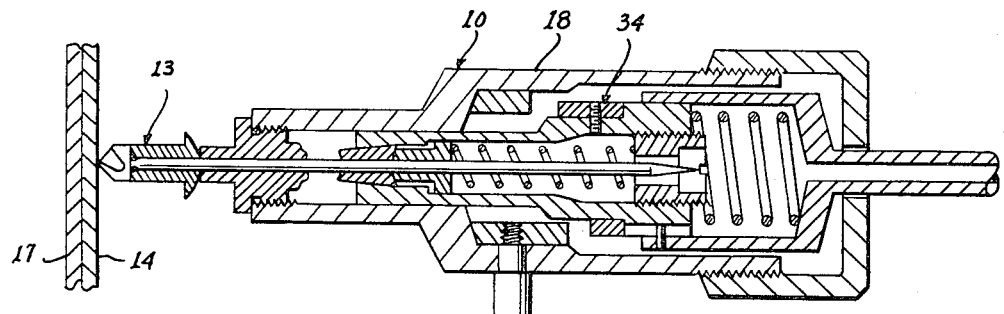
FIG. 4 is an elevational view, in section, illustrating the operative arrangement of the elements therein at the initial stage of the drilling phase of the installation of the rivet of FIG. 3.

Attention is now directed to FIGS. 4–6 which specifically illustrate the operative arrangement of the elements of the device of the present invention during the various phases of operation. FIG. 4 illustrates the rivet installation tool 10 with the rivet 13 at the beginning of the drilling cycle. During this phase, the chuck assembly 34 is retracted rearwardly within the housing 18.

FIG. 5 illustrates that phase of operation just after the rivet 13 has penetrated the layers of material 14 and 17, just prior to the upsetting of the rivet. The chuck assembly 34 has moved forward in the direction of the arrow B in response to pressure from the drill motor. The gripping jaws 38 and 38a have correspondingly moved forward and have secured a new hold upon the shank 60 while the cam-followed 43 has engaged the cam-rise surface 28 of the annular member 27.

FIG. 6 illustrates the chuck assembly 37 after having been urged in a rearward direction as indicated by the arrow C by the interaction of the cam-follower 43 upon the face of the cam-rise surface 28. At this point, the rivet 13 has been upset on the blind side by the retraction of the drilling head 61 against the sleeve 58 just prior to the separation of the shank 60 at the annular indentation 62.

In the foregoing detailed description of the drawings, the rivet installation tool has been specifically illustrated as a hand stabilized unit powered by an attached electric drill motor. It will be readily apparent to those skilled in the art that according to the teachings of the present invention, the principles embodied therein could be extended to incorporate a redesigned main housing including an integral driving motor. Further, it is apparent that while the detailed description primarily was concerned with the installation of self-drilling, pull-type blind rivets, the device of the present invention would be equally effective in the installation of ordinary pull-type blind rivets after the required holes in the layers to be adjoined had been drilled.

Various other changes in the devices herein chosen for purposes of illustration will readily occur to persons skilled in the art. Such modifications and variations, while not explicitly denoted in the foregoing detailed specification, do not deviate from the teachings of the present invention, and are intended to be included in the scope and spirit thereof which is limited only by a fair interpretation of the following claim.

Having fully described and disclosed the invention and what I conceive to be the presently preferred embodiment thereof, in such a manner as to enable those skilled in the art to understand and practice the same, I claim:

1. A rivet installation tool, particularly adapted for inserting and upsetting self-drilling, pull-type blind rivets, said rivet installation tool comprising:
    (a) a housing having an upper end and a lower end with a central aperture located within the lower end;
    (b) means for stabilizing said housing against rotation;
    (c) an internal annular cam-rise surface proximate the lower end of said housing;
    (d) a chuck assembly dispossed within said housing and adapted for rotational and longitudinal movement therein, said chuck assembly comprising;
        a coaxial tubular casing having an upper end and a lower end;
        spring-actuated gripping jaws carried by the lower end of said casing; and
        a cam-follower carried by said tubular casing, said cam-follower adapted for intermittent operative engagement with the cam-rise surface located within said housing;
    (e) means for rotating said chuck assembly, said means adapted to permit limited longitudinal movement of said assembly while rotating; and
    (f) spring means urging said rotatable chuck assembly downwardly within said housing.

References Cited

UNITED STATES PATENTS

| | | | |
|---|---|---|---|
| 1,712,456 | 5/1929 | Kollock | 72—452 |
| 2,437,191 | 3/1948 | Gill | 72—114 |
| 2,583,733 | 1/1952 | Fischer | 72—114 |

CHARLES W. LANHAM, *Primary Examiner.*

G. P. CROSBY, *Assistnat Examiner.*